United States Patent
Hake et al.

(10) Patent No.: US 6,917,798 B1
(45) Date of Patent: Jul. 12, 2005

(54) METHOD FOR THE REAL-TIME BILLING OF TELECOMMUNICATION LINKS WHEN A SUBSCRIBER IS LOCATED OUTSIDE HIS HOME NETWORK

(75) Inventors: Jens Hake, Kemtau (DE); Jörg Thelen, Bonn (DE)

(73) Assignee: T-Mobile Deutschland, Bonn (DE)

( * ) Notice: Subject to any disclaimer, the term of this patent is extended or adjusted under 35 U.S.C. 154(b) by 0 days.

(21) Appl. No.: 09/763,075
(22) PCT Filed: Aug. 18, 1999
(86) PCT No.: PCT/DE99/02569
§ 371 (c)(1), (2), (4) Date: Apr. 26, 2001
(87) PCT Pub. No.: WO00/11861
PCT Pub. Date: Mar. 2, 2000

(30) Foreign Application Priority Data

Aug. 19, 1998 (DE) .......................... 198 37 460

(51) Int. Cl.[7] .............................................. H04M 11/00
(52) U.S. Cl. ...................... 455/406; 455/407; 455/408; 455/432.1; 379/114.01; 379/114.28; 379/115.2
(58) Field of Search ................................. 455/406, 407, 455/408, 410, 416, 432.1, 432.2, 433; 379/114.01, 114.03, 114.14, 114.2, 114.28, 115.02, 115.03

(56) References Cited

U.S. PATENT DOCUMENTS

| | | | | | |
|---|---|---|---|---|---|
| 4,756,020 | A | * | 7/1988 | Fodale | 379/114.14 |
| 5,027,387 | A | * | 6/1991 | Moll | 379/115.02 |
| 5,590,175 | A | * | 12/1996 | Gallant et al. | 455/433 |
| 5,815,810 | A | * | 9/1998 | Gallant et al. | 455/433 |
| 5,826,185 | A | | 10/1998 | Wise et al. | 455/405 |
| 6,029,062 | A | * | 2/2000 | Hanson | 455/408 |
| 6,064,875 | A | * | 5/2000 | Morgan | 455/410 |

FOREIGN PATENT DOCUMENTS

| WO | WO 93/01677 | 1/1993 |
|---|---|---|
| WO | WO 94/28689 | 12/1994 |
| WO | WO 97/19548 | 5/1997 |
| WO | WO9719548 | * 5/1997 |
| WO | WO 98/34393 | 8/1998 |
| WO | WO 98/34425 | 8/1998 |

* cited by examiner

Primary Examiner—Stephen M. D'Agosta
(74) Attorney, Agent, or Firm—Baker & Daniels

(57) ABSTRACT

A method of real-time billing of telecommunications links when a subscriber is located outside his or her own network. The method is characterized in that the establishment of the telecommunications links and the control of the real-time billing are carried out through the home network so that the home network remains in control of the cost-generating links.

1 Claim, 1 Drawing Sheet

METHOD FOR THE REAL-TIME BILLING OF TELECOMMUNICATION LINKS WHEN A SUBSCRIBER IS LOCATED OUTSIDE HIS HOME NETWORK

CROSS-REFERENCE TO RELATED APPLICATION

This application is a 371 of Application Ser. No. PCT/DE99/02569, filed Aug. 18, 1999.

BACKGROUND OF THE INVENTION

The invention relates to a process for the real-time charge-setting of telecommunication connections with one of the participants staying outside of his own network.

At present, in mobile radio networks, essentially two processes are to be distinguished for the real-time charge-setting of telecommunications connections. These are based on an implementation of prepaid access entitlements, so called prepaid participant relations, which, however, are not suitable for use outside of the home network in which the charge-computing takes place. This, however, is desirable in the case of modern, internationally standardized mobile radio networks with reciprocal agreement for the so-called "roaming".

For one thing, it is a known practice to perform a real-time coverage of the connection fees falling due in corresponding arrangements of the telecommunication network, as well as the interruption of the current and of further connections when a prepaid credit is used up. This process, however, does not permit use outside of the home network of the participant. The reason for this is that no real-time exchange of fee data is provided between the different networks and no real-time exchange of fee data is provided, since that would have as a consequence too high an administrative expenditure. There, the time between the point at which the charge are falling due and the communication of the charge data and computation of the charges in the home network, can be used for connections not covered by a credit balance.

For this WO-A-98 34425 discloses a process for the real-time charge-setting of incoming connections to subscribers who are located in a roaming network. The charge-setting takes place through a real-time control of the subscriber entitlement profiles in the home register of the home network, and the conveyance of the subscriber data to the roaming network. If a call is received from the home network for the subscriber located in a roaming network, examination is made as to whether the subscriber is entitled to the roaming and has a sufficient credit at his disposal, before the connection is set up. A real-time charge-setting of outgoing connections from the roaming network is not possible.

In the second place, it is known that a real-time coverage of the connection fees that fall due takes place in the end-apparatus, this however being possibly undercut by inadvertently or intentionally faulty end-apparatus software.

Underlying the invention is the problem of proposing a process for the real-time charge-setting of telecommunication connections with a subscriber located outside of his home network, which is to be implemented simply and economically, and which makes do without any, or with only slight, modifications to existing network arrangements.

SUMMARY OF THE INVENTION

The invention is based on the concept that the building-up of the telecommunication connection and the real-time charge coverage take place through the home network, even if one of the subscribers is located outside of his home network.

With a subscriber located outside of his home network, abroad for example, through a configuration of the subscriber relation no direct building-up of a telecommunication connection is possible over the foreign telecommunication network.

If a connection is desired with one of the participants located abroad, there occurs first of all a transmission of an information telegram to a special network element in the home network of that participant, in which telegram there is conveyed at least the target call number of the desired connection, as well as the identity of the calling participant. In a preferred form of execution, the data telegram consists of a brief message which is sent by means of Short Message Service (SMS). It is also provided, however, to assign to the special network element a certain call number which can be dialed by the participant. In the dialog process, then, the call number of the desired conversation participant is inquired of the network element and this can be put in over the keyboard of the end apparatus.

The special network element, after checking of the data and of the allocated actual fee credit, builds up the connections to the called—and to the calling participants. In a preferred form of execution, the special network element consists of a ring-back server with connections to intelligent network functions which simultaneously can also be responsible for the monitoring of the prepaid fees (Pre-Paid Server).

Since all the cost-causing connections are built up in the home network, it is possible, in a customary manner, to have a real-time monitoring of the connection, and the connection can be broken off in the event that the credit is used up.

If a special protection against misuse of the communicated data is desired, the transmission of the data can occur by means of an application to the participant's identity module (SIM for example), with use of a suitable cryptographic process. The development of the requisite protocols occurs through the participant's identity module, which also performs the identification of the participant with respect to the network. It is thus ensured that unauthorized parties cannot telephone at the expense of other participants.

The essential advantage of the invention lies in that the initiation and control of the cost-causing connections always take place through network elements located in the home network, even if the subscriber happens to be in a foreign telecommunication network.

There is present, further, the advantage that the transmission of fee-relevant information data can occur through end-to-end encoded message transmission, with use of cryptographic keys, the issuing of which lies under control of the home network operator.

A further advantage is that, by the coded transmission of the data, a misuse of subscriber relations by unauthorized persons is prevented. It is not possible for third parties to conduct conversations from the domestic and/or foreign territory at the expense of the entitled subscriber.

BRIEF DESCRIPTION OF THE DRAWING

In the following, the invention is explained in detail with the aid of an example of execution shown in FIG. 1.

DETAILED DESCRIPTION

Figure 1:
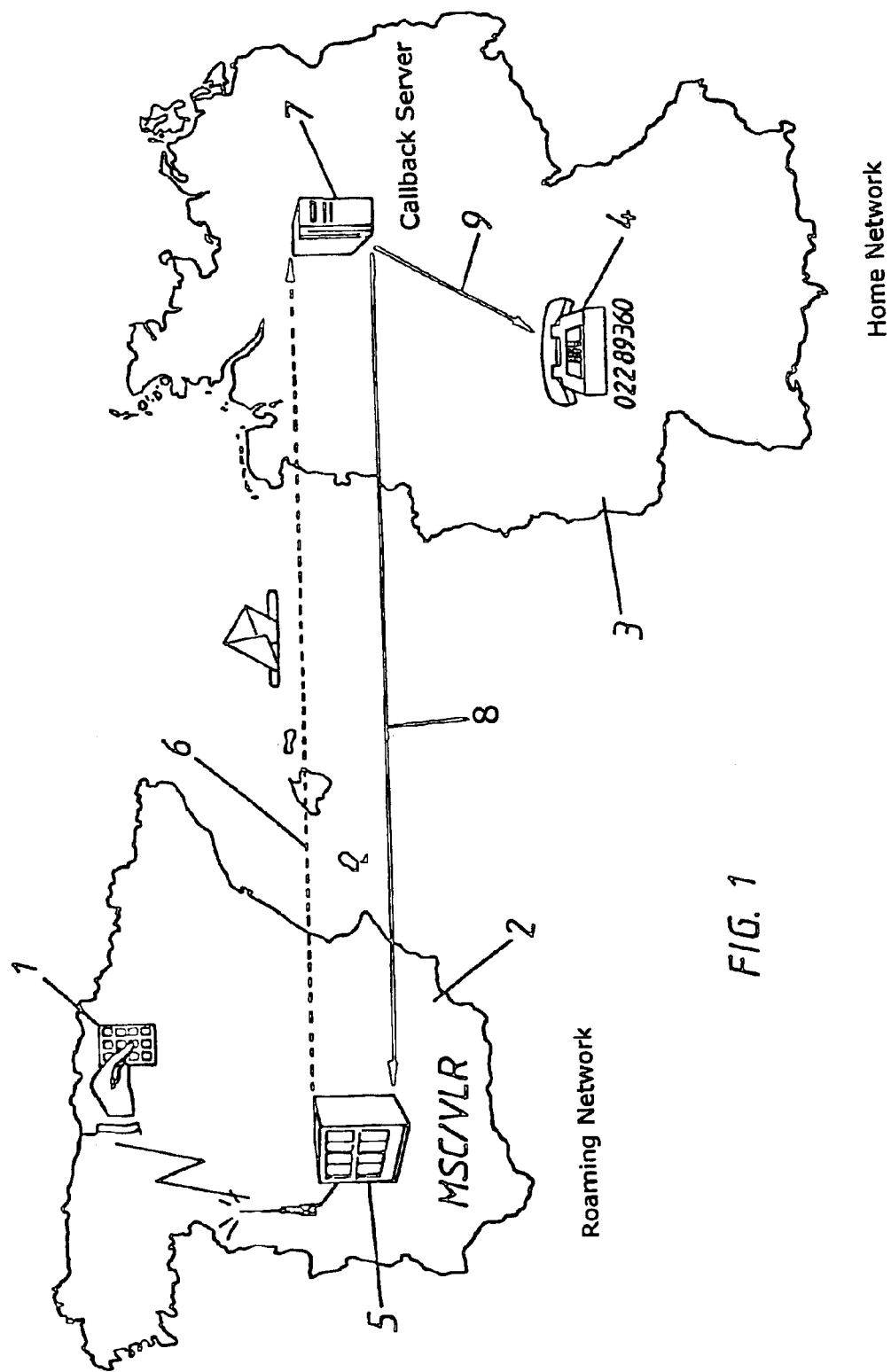

FIG. 1 of the drawing shows as an example a mobile radio subscriber 1, who is located in the territory of a foreign mobile radio network 2 that lies outside his own mobile radio network 3. The mobile radio networks 2 and 3 are, for example, mobile radio networks according to the GSM standard. It is presumed that a roaming agreement exists between the operators of the mobile radio networks 2 and 3. The mobile radio subscriber 1 now desires the establishment of a conversation connection to an arbitrary subscriber 4 who is to be reached, for example, under the call number 02289360. For this the subscriber 1 must first enroll in the foreign mobile radio network 2 and he is then served by the responsible mobile exchange center 5. According to the invention, it is now impossible for the mobile radio subscriber 1 directly to establish a conversation connection to the subscriber 4. The Subscriber 1 can, however, for example by means of a brief message over the Short Message Service (SMS), send a data telegram 6 to a call-back server 7 arranged in the home network 3. The data telegram, there, contains at least the target call number (02289360) of the subscriber 4 and the call number (+4927999xxxxxxx) of the calling subscriber 1. The use of the Short Message Service presents the advantage that in the short message the identity of the calling subscriber is communicated.

The call-back server 7 is bound in a known manner into the home network 3, and it is constructed as a standard component. From the received data telegram 6, the call-back server 7 extracts the call number of the called—and that of the calling subscribers, and thereupon it initiates a connection 8 to the calling subscriber 1, that is to say to the sender of the telegram 6, and establishes a connection 9 to the desired target call number, that is to say to a subscriber 4. Now conversation connection is built up between the mobile radio subscriber 1 and the subscriber 4, which connection is completely initiated and controlled by the home network 3 and the outgoing connections may be locked with the subscriber located outside his home network. In a customary manner, there can now occur a real-time monitoring of the connection fees for the connections 8 and 9, in which the connection fees are then directly computed by the home network 3 and can be deducted from the prepaid credit of subscriber 1. The charge coverage of the connections may take place through an IN on-line charge-setting.

What is claimed is:

1. A process for the real-time charge-setting of telecommunication connections between a calling subscriber located outside of his home network in the zone of a foreign mobile phone radio network, and a called subscriber, comprising:

upon the arising of a desire on the part of the calling subscriber for a connection, sending an information telegram over the mobile phone networks as a Short Message (SMS) by the calling subscriber to a special network element located in the home network, the telegram containing at least the desired target number of the called subscriber and the identity of the calling subscriber, the special network element checking the data contained in the received telegram and then building-up telecommunication connections to the called and calling subscribers, the building-up of the connections between the calling subscriber and the called subscriber and the real-time charge-setting taking place through the home network, the special network element, after checking the current charge credit allocated to the data, building up the connections to the called and calling subscribers;

wherein outgoing connections with the subscriber located outside of his home network are blocked, the charge coverage of the connections takes place through an IN on-line charge-setting, and the special network element is implemented in the form of a call-back server with connection to intelligent network functions.

\* \* \* \* \*